(12) United States Patent
Bickerstaff et al.

(10) Patent No.: US 6,795,487 B1
(45) Date of Patent: Sep. 21, 2004

(54) RECEIVER

(75) Inventors: Jacqueline Peta Bickerstaff, Northamptonshire (GB); Gerald Whitworth, Northampton (GB)

(73) Assignee: Ceva Ireland Limited (IE)

( * ) Notice: Subject to any disclaimer, the term of this patent is extended or adjusted under 35 U.S.C. 154(b) by 0 days.

(21) Appl. No.: 09/473,454

(22) Filed: Dec. 28, 1999

(30) Foreign Application Priority Data

Jul. 5, 1999 (GB) .............................................. 9915720

(51) Int. Cl.$^7$ ............................ H04L 27/30; H04B 1/10
(52) U.S. Cl. ...................... 375/147; 375/148; 375/150; 375/140; 375/134; 375/350; 370/342
(58) Field of Search ................................ 375/150, 147, 375/148, 140, 134, 350; 370/342, 335, 350, 209

(56) References Cited

U.S. PATENT DOCUMENTS

| | | | |
|---|---|---|---|
| 4,672,629 A | 6/1987 | Beier | 375/1 |
| 5,850,420 A | 12/1998 | Guillard et al. | 375/316 |
| 5,963,582 A | * 10/1999 | Stansell, Jr. | 375/148 |
| 5,987,014 A | * 11/1999 | Magill et al. | 370/335 |
| 5,991,332 A | * 11/1999 | Lomp et al. | 375/152 |
| 6,201,843 B1 | * 3/2001 | Kingston et al. | 375/350 |
| 6,404,801 B1 | * 6/2002 | Lennen | 375/134 |
| 6,459,693 B1 | * 10/2002 | Park et al. | 370/342 |
| 6,470,000 B1 | * 10/2002 | Burns et al. | 370/342 |
| 6,611,512 B1 | * 8/2003 | Burns | 370/342 |

FOREIGN PATENT DOCUMENTS

| | | | |
|---|---|---|---|
| EP | 0 513 349 A1 | 11/1992 | G01S/5/14 |
| GB | 2 155 268 A | 9/1985 | G01S/5/14 |
| GB | 2 235 346 A | 2/1991 | G01S/13/34 |
| GB | 2 265 061 A | 9/1993 | G01S/13/38 |
| GB | 2 304 249 A | 3/1997 | G01S/13/34 |
| GB | 2 307 809 A | 6/1997 | G01S/13/32 |
| WO | WO 94/23505 | 10/1994 | H04B/7/185 |
| WO | WO 95/30287 | 11/1995 | H04B/1/69 |
| WO | WO 96/37789 | 11/1996 | G01S/1/04 |
| WO | WO 99/30433 | 6/1999 | |

* cited by examiner

*Primary Examiner*—Stephen Chin
*Assistant Examiner*—Edith Chang
(74) *Attorney, Agent, or Firm*—Kilpatrick Stockton LLP (57) ABSTRACT

A positioning or timing receiver, for receiving pseudo-noise encoded signals includes mask mixers in the main signal paths, prior to accumulators. The mask mixers are fed with mask signals having a period equal to the period of the pseudo-noise code, provided by a mask generator. The mask generator and mixers provide an extra level of functionality in the receiver, through which a large number of uses can be made. For example, without modifying a code signal mixed into the main signal path, the mask mixers allow dynamic adaptability from a wide correlator to a narrow correlator by simple control of the mask generator. Many different discrimination patterns can be obtained. By changing the mask signals and examining correlator outputs, it is possible to detect whether a signal being tracked contains a multipath component. The receiver also includes a switch, whereby two correlators may be fed with signals from the in-phase main signal path.

40 Claims, 8 Drawing Sheets

FIG. 1

PRIOR ART

RECEIVER

FIELD OF THE INVENTION

The present invention relates to a receiver for receiving radio-frequency pseudo-random encoded signals from satellites of a universal ranging system.

BACKGROUND OF THE INVENTION

A positioning or timing receiver in a universal ranging system must receive and process signals from several satellites, such as those of the GPS or Glonass constellations, to obtain a measurement of its position or to establish a timing reference. The signals from a given satellite are processed in a dedicated channel, a conventional example of which is shown schematically in FIG. 1.

Figure 1:
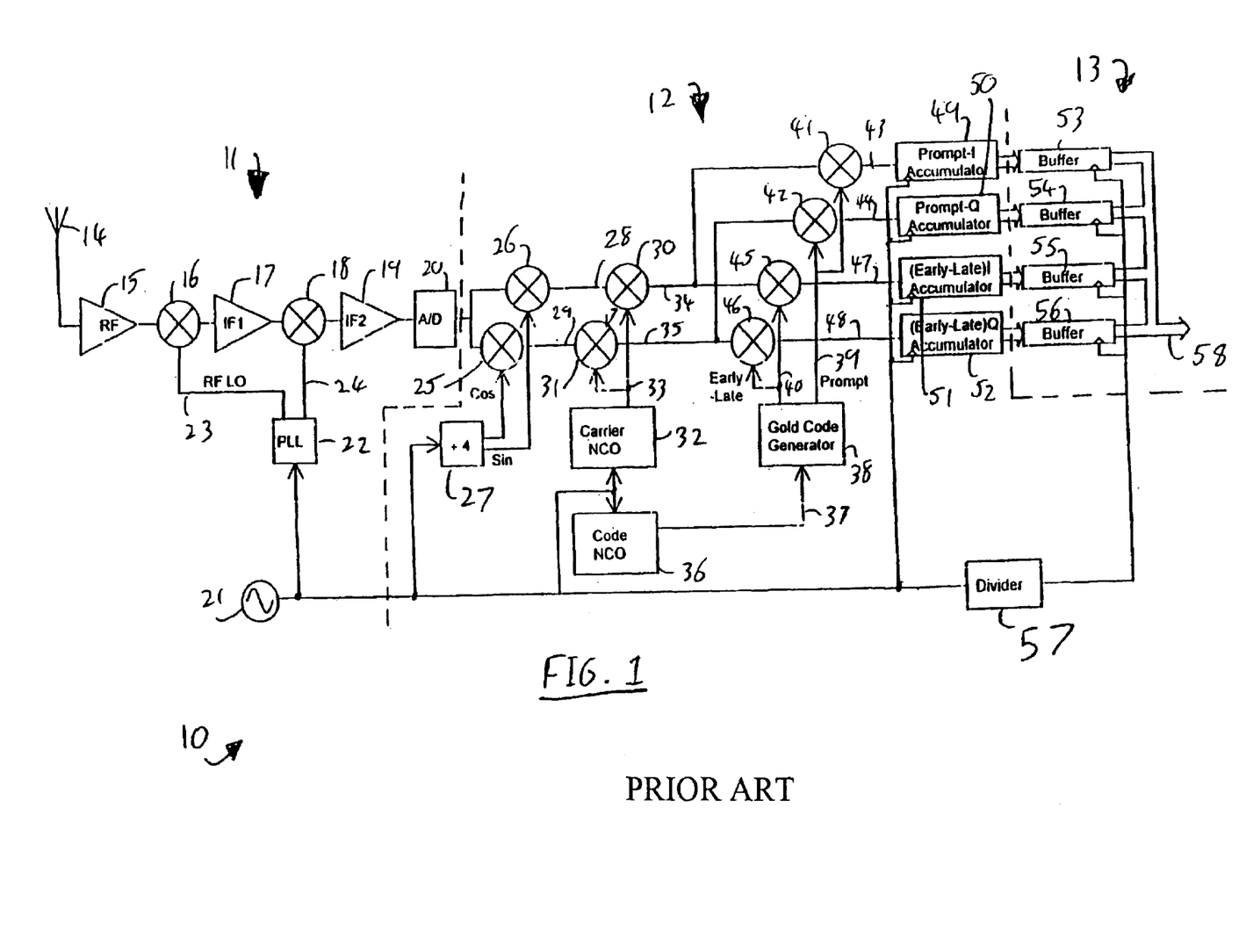
FIG. 1 is a schematic diagram of a prior art receiver channel.

Referring to FIG. 1, a receiver channel 10 of a positioning receiver comprises generally an analogue section 11, a digital section 12 and a digital/software interface 13. The interface 13 is connected to a micro-processor (not shown) which processes interface output signals with software. The primary signal path of the analogue section comprises, from an antenna 14, a radio frequency (RF) amplifier 15, a first mixer 16, a first intermediate frequency (IF) amplifier 17, a second mixer 18, a second IF amplifier 19 and an analogue to digital converter (ADC) 20. A 20 MHz reference frequency oscillator 21 provides a 20 MHz reference signal to a phase lock loop (PLL) 22, which provides local oscillator signals on outputs 23 and 24 to the mixers 16 and 18 respectively.

The ADC 20 provides a three-level output signal (i.e. occupying two bit lines) sampled at 15.42 MHz to signal inputs of each of two digital mixers 25 and 26, which define an input of the digital section 12. The oscillator 21 is connected to feed the 20 MHz reference 30 frequency signal also to a digital frequency divider 27, which provide orthogonal phase digital cos and sin signals at 5 MHz to local oscillator inputs of the mixers 25 and 26 respectively. In-phase (I) and quadrature (Q) digital signals are therefore provided on mixer outputs 28 and 29 respectively. A carrier numerically controlled oscillator (NCO) 32 is connected to receive the 20 MHz signal from the oscillator 21. The carrier NCO 32 is controlled to provide oscillator signals on an output 33 at such a frequency as to cause the mixers 30 and 31 to provide baseband I and Q signals on their outputs 34 and 35 respectively. These baseband signals are modulated only (in the case of signals from GPS satellites) by the C/A code at 1.023 MHz and by the data which is carried on the signals at 50 bits per second.

A code NCO 36 is connected to receive the 20 MHz signal from the oscillator 21 and is controlled to provide code clock signals at an output 37. The code clock signals are referenced to the frequency of the oscillator 21 but are equal in frequency to the code, (1.023 MHz for GPS L1 signal codes). During code tracking, a code replica generator 38 receives the code clock signals and is controlled to provide prompt code replica signals on an output 39 and early-minus-late code replica signals on an output 40. The early-minus-late code replica signals are generated by subtracting code replica signals which are phase-delayed with respect to the prompt code replica signals from code replica signals which are phase-advanced with respect to the prompt signals. First and second prompt code mixers 41 and 42 are connected to mix the baseband I and Q signals on the outputs 34 and 35 with the prompt code replica signals to provide prompt I and prompt Q signals on respective outputs 43 and 44. First and second early-minus-late mixers 45 and 46 similarly provide early-minus-late I and early-minus-late Q signals on respective outputs 47 and 48 by mixing the baseband I and Q signals with the early-minus-late code replica signals. Each of the signals provided by the mixers 41, 42, 45 and 46 is accumulated in a respective accumulator 49–52. The accumulators 49–52 are clocked by the oscillator 21, and subsequently buffered into data form by respective buffers 53–56. The buffers 53–56 are clocked by a signal obtained from the oscillator 21 by a frequency divider 57. The output signal of the frequency divider 57 thereby defines accumulation intervals. The outputs of the buffers 53–56 are collated into an output 58 for subsequent software processing. A feedback path (not shown) allows the frequency and phase of both the carrier NCO 22 and the code NCO 36 to be dynamically controlled to maintain alignment with the 30 received signal.

In another known positioning receiver, code replicas may be switched to vary the delay of the early-minus-late code signals so that the receiver channel can function as a conventional correlator during signal acquisition and as a narrow correlator during signal tracking. In either case, a prompt code replica is aligned with the C/A code modulated onto the received signal when an output signal of an early-minus-late correlator is zero.

In a multipath environment, signals which are reflected before arrival at the receiver are delayed in time with respect to the arrival of the direct signals. Although reflected signals are of lower amplitude than the direct signals (except when the line of sight is obstructed), they cause problems with alignment of the prompt correlator with the early-minus-late correlator, when the reflected signals are within around one period or chip of the code of the direct signals. This is a recognised problem which is addressed at least in part by the narrow correlator operation mentioned above. Narrow correlators have the effect of reducing the effect that a reflected signal has on the alignment of the correlators by reducing the effect of the reflected signals. Two other approaches have been taken in an attempt to improve signal resolution in the presence of multipath signals.

Firstly, it is known to use in a receiver a plurality, typically 4 or 6, of parallel correlators each using a different delay of the early-minus-late code signals. This approach, in effect, involves sampling the discrimination pattern at a number of points, equal to the number of correlators, to provide data which can be resolved by software as a series of simultaneous equations. The solutions to the simultaneous equations identify the reflected signals, which can thus be isolated from the direct signal. Obviously, a greater number of correlators results in a greater resolution of the signals and, therefore, more accurate position measurements. However, such an approach requires a considerable increase in hardware (the extra correlators) and in processing power to resolve the signals. Although a similar effect can be achieved by assigning the use of plural channels for the resolution of one signal, each channel having a differently phased early-minus late code signal, the same disadvantages are present.

A second approach has been to generate code signals comprising a set of recurring non-zero three-level gating signals having equal positive and negative areas and a polarity at a centre point which depends on whether a corresponding edge of the code modulated on the received signals is a rising or a falling edge. This approach provides an error signal or discrimination pattern which allows steering around the alignment point but which has zero response to multipath signals falling more than a short distance from the alignment point.

SUMMARY OF THE INVENTION

According to the present invention, a receiver, for receiving and processing radio-frequency pseudo-random encoded signals, comprises in a channel thereof:
- a code replica generator arranged to provide code replica signals on an output thereof;
- a mask generator device controllable to provide any one of at least two predetermined time varying mask signals at an output thereof;
- a frequency translator arranged to receive and to frequency translate the encoded signals and to provide translated signals in response thereto;
- a signal path of the channel comprising between the frequency translator and an accumulator:
- a code mixer arranged to mix the translated signals with the code replica signals; and
- a mask mixer arranged to mix the translated signals with the mask signals, the mask signals having a period equal to an integer multiple of the chip period of the code replica signals.

The controllability of the mask generator device gives the receiver versatility in terms of the correlations that can be performed. Significantly, it is possible to construct a receiver which has additional functionality without the use of additional clock frequencies, clock trees or other clocking circuitry. This is especially advantageous in deep, sub-micron design, where wiring delays of ten exceed gate delays, and if a design needs to be reused. A clock-based delay mechanism may also restrict a receiver design to a particular frequency plan and therefore limit the satellite constellations from which signals can be used to make position measurements.

According to a second aspect of this invention, a method of processing radio-frequency pseudo-random encoded signals comprises: frequency translating the encoded signals; mixing the frequency translated signals with code replica signals; storing at least two different mask patterns; providing mask signals corresponding to one of the mask patterns and having a period equal to an integer multiple of the chip period of the code replica signals; mixing the mask signals with the frequency translated signals; and accumulating the resultant signal.

According to a third aspect of this invention, a receiver for receiving radio frequency pseudo-random coded signals, a channel of the receiver comprises:
- a frequency translator arranged to frequency translate the coded signals to provide translated signals;
- a first mixer arranged to mix the translated signals with a local oscillator signal to provide in-phase translated signals on a first signal path;
- a second mixer arranged to mix the translated signals with a quadrature version of the local oscillator signal to provide quadrature translated signals on a second signal path;
- each of the first and second signal paths comprising a respective further mixer subsequent to its respective mixer, and a respective accumulator subsequent to its at least one further mixer;
- characterised in having a switch connected subsequent the first and second mixers and prior to the further mixer in each path, the switch being controllable to provide the at least one further mixers in both of the first and second paths with one of the in-phase translated signals and the quadrature translated signals, the signals on the first and second signal paths each being mixed with an early-minus-late version of a replica code.

In this way it is possible to construct a receiver having a channel which, after code lock, has two signal paths provided with the same signal, which allows two different techniques of signal processing to be carried out simultaneously on a signal without the requirement of an extra signal path and associated hardware.

According to a fourth aspect of this invention, a method of detecting the presence of multipath interference on a received signal, comprises:
- on a first signal path, mixing the received signal with a first signal;
- in a first accumulator accumulating the signal provided by the first signal path;
- on a second signal path, mixing the received signal with a second signal different from the first signal;
- in a second accumulator, accumulating the signal provided by the second signal path;
- comparing an output of the first accumulator with an output of the second accumulator; and
- providing an indication if the outputs are not substantially in an expected ratio.

BRIEF DESCRIPTION OF THE DRAWINGS

Embodiments of the invention will now be described with reference to the accompanying drawings in which.

DETAILED DESCRIPTION OF THE PREFERRED EMBODIMENTS

Figure 2:
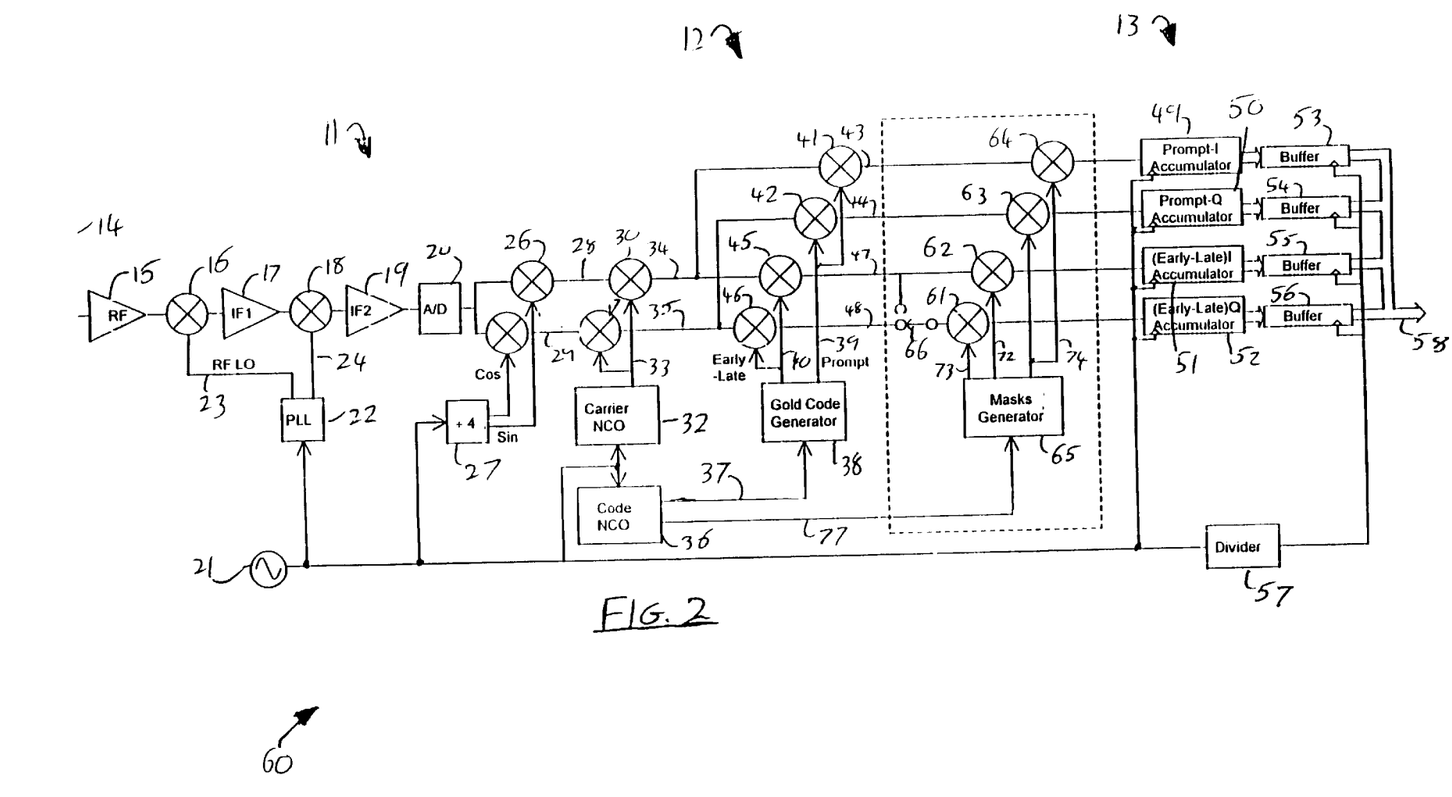
FIG. 2 is a schematic diagram of a receiver channel in accordance with this invention.

In FIG. 2, showing a receiver channel 60 in accordance with the invention, reference numerals have been retained from FIG. 1 for like elements. The channel 60 comprises, additionally, first to fourth mask mixers 61 to 64, a mask generator 65 and a switch 66. The mask mixers 61 to 64 are connected in the respective main signal paths between the mixers 46, 45, 42 and 41 and their associated accumulator 52–49. The switch 66 is controllable to provide either the early-minus-late I or early-minus-late Q decoded signals to the main signal input of the first mask mixer 61. In normal operation, the switch 66 is controlled to provide the early-minus-late Q signal to the mixer 61.

The code mixers 41, 42, the mask mixers 63, 64, the accumulators 49, 50 and the buffers 53, 54 together form a carrier loop correlator or carrier discriminator. A software controlled data processor processes the data provided by the carrier loop correlator to determine the phase of the carrier of the positioning signals. Correction signals are fed back from the data processor to control the frequency and the phase of the carrier NCO 32.

Figure 3:
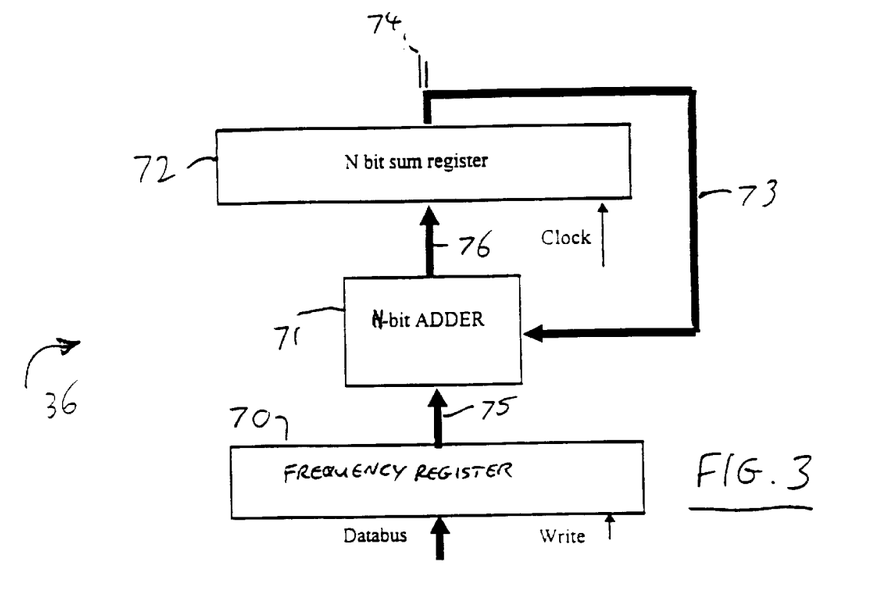
FIG. 3 is a schematic diagram of a code NCO 36 in the receiver channel of FIG. 2.

Referring to FIG. 3, the code NCO 36 has a frequency register 70, an N-bit adder 71, an N-bit sum register 72, a feedback path 73 and an output 74. The frequency register 70 is programmed with a number which determines the frequency of the signals provided at the output 74 and on the feedback path 73. The programmed number is provided on a digital line 75 to a first input of the adder 71. The adder 71 sums the value on the line 75 with the digital value present on the feedback path 73 on every rising clock edge (the clock signal is provided by the oscillator 21) and provides the result on a bus 76. The sum register receives this sum value on the rising edge of the clock and provides the sum value to the feedback path 73 as an N bitline signal. When the sum of the values on the lines 75 and 73 exceeds $2^N-1$, overflow occurs and an output signal of zero plus the remainder is provided. The most significant bit (msb) of this output signal is provided to the code generator 38 as the code clock signal on the line 37. The four most significant bits of the feedback path 73 30 signal are provided as an output signal at the output 74, and therefore are provided to the mask generator 65 on the bus 77. The code NCO 36 stores the phase of the output signal to a resolution of $2^N$.

Figure 4:
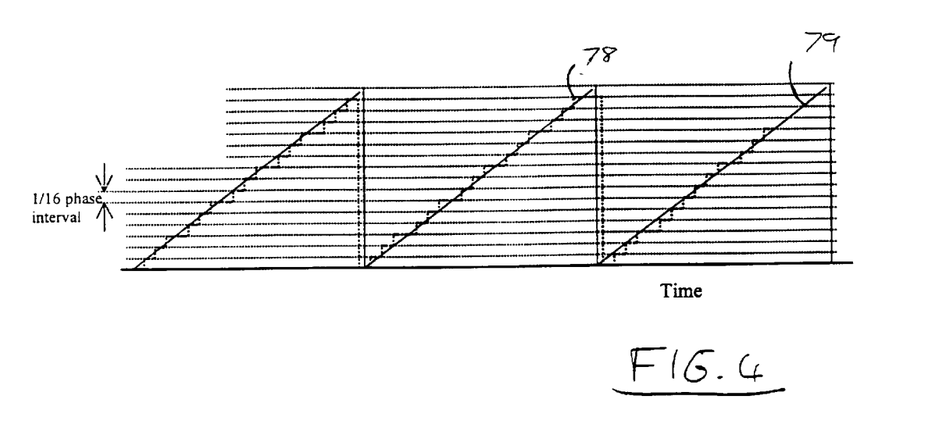
FIG. 4 is a schematic diagram showing output signals of the FIG. 3 code NCO.

FIG. 4 shows a signal 78 of the code NCO 36 comprising the four most significant bits of the output signal. Here, the programmable number is Hex 3460A which, using the formula: output frequency=(input clock frequency x programmed number) $\div 2^N$ (N=24 in this instance), gives a signal on the msb line having a precisely controllable frequency of 1.023 MHz from the 20 MHz frequency output signal of the oscillator 21.

It will be noted that, unlike a conventional counter based oscillator, the NCO has irregular periods between steps. This is a result of only the four most significant bits of the output signal being used to provide the signal 78. However, the jittering of this signal does not substantially hinder the operation of the receiver. An approximation of the output signal 78 is shown as line 79.

The mask generator 65 has an early-minus-late Q output 72, an early-minus-late I output 73 and a prompt output 74. The outputs 72–74 are associated with three respective mask generator devices (described below) which are individually controllable to provide respective mask signals, which may be different from each other.

Figure 5A:
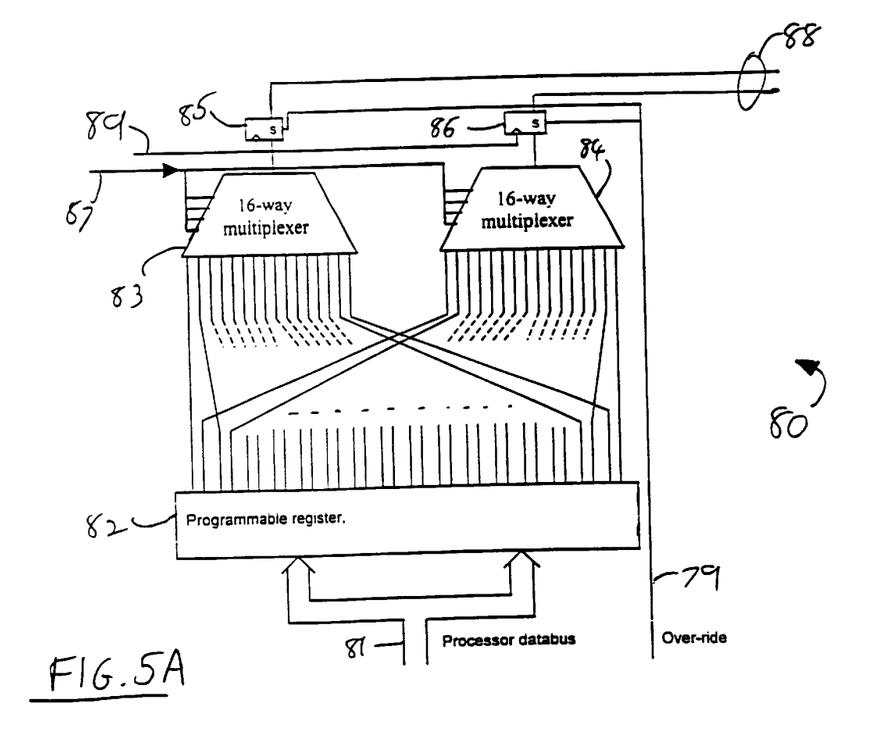
FIGS. 5A and 5B are schematic diagrams of alternative mask generator devices which are used in the FIG. 2 receiver channel.

Referring to FIG. 5A, each mask generator device 80 comprises a databus input 81, a bank of 32 single-bit programmable registers 82, first and second 16-way multiplexers 83 and 84, and first and second clocked flip-flops 85 and 86. An input 87 is connected to the output 74 of the code NCO 36. A two bitline mask generator device output 88 is provided by the first flip flop 85, which is connected to an output of the first multiplexer 83, and by the second flip-flop 86, which is connected to an output of the second multiplexer 84. Odd numbered programmable registers of the bank 82 are connected to consecutive inputs of the first multiplexer 83. Even numbered programmable registers of the bank 82 are connected to consecutive inputs of the second multiplexer 84.

The code generator 38 is controllable to provide early with late, early with prompt, or one-chip early-minus-late with prompt code signals on the outputs 39 and 40. The different code signals are used for different channel tasks, e.g. for signal search or for signal tracking.

Operation of the mask generator device 80 is as follows. The bank of programmable registers 82 is programmed with data from the databus input 81 to define a mask pattern. Each programmable register is permanently connected to an input of one of the multiplexers 83 and 84. The multiplexers 83 and 84 pass a signal present at one of their inputs to their respective flip-flop 85, 86 according to the value of the signal received at the input 87. Since the signal received at the input 87 takes the form of the signal 78 (FIG. 4), each multiplexer, in effect, sweeps across its inputs once in the chip period of the code replica signals, switching at, on average, one-sixteenth of the interval of the chip period. The signals provided at the output 88, which are dependent on the mask pattern, are hereinafter referred to as mask signals. The mask signals are repetitive with a period equal to the chip period of the code.

The flip flops 85 and 86 resynchronise the phase intervals of the mask signals to the system clock, thereby absorbing the delay of multiplexers 83 and 84 and preventing the mask signals at the output 88 changing between clock intervals. This is achieved by clocking their respective input signal through to their respective output on the rising edge of the clock. The clock signal applied to the clock input 89 is taken directly from the reference oscillator 21.

The mask signals provided at the output 88 comprise three-level signals (one bit line being a sign bit line and the other being an amplitude bit line) having sixteen components substantially equally spaced and of substantially equal duration in a chip period, although the jitter of the signal 78 is translated to jitter of the timing of the components of the mask signals. Since the accumulators average the signals over, typically, 1000 chip periods, the jitter of the mask signals is not critical.

As is described below, different mask signals have different effects on the processing of the received signals.

The term 'mask' arises from the fact that, since the mask signals have the same period as the chip period of the code replica signals, the signals passing to the accumulators are masked in each chip period by the mask pattern. This is due to the multiplying nature of the mask mixer. Where the mask signals comprise more than simple binary signals, the masking process still comprises a simple multiplication process. Here, the signals passing to the accumulators are multiplied by the value of the mask signals at any given moment in time, whatever the sign and the amplitude of the mask signals.

Figure 5B:
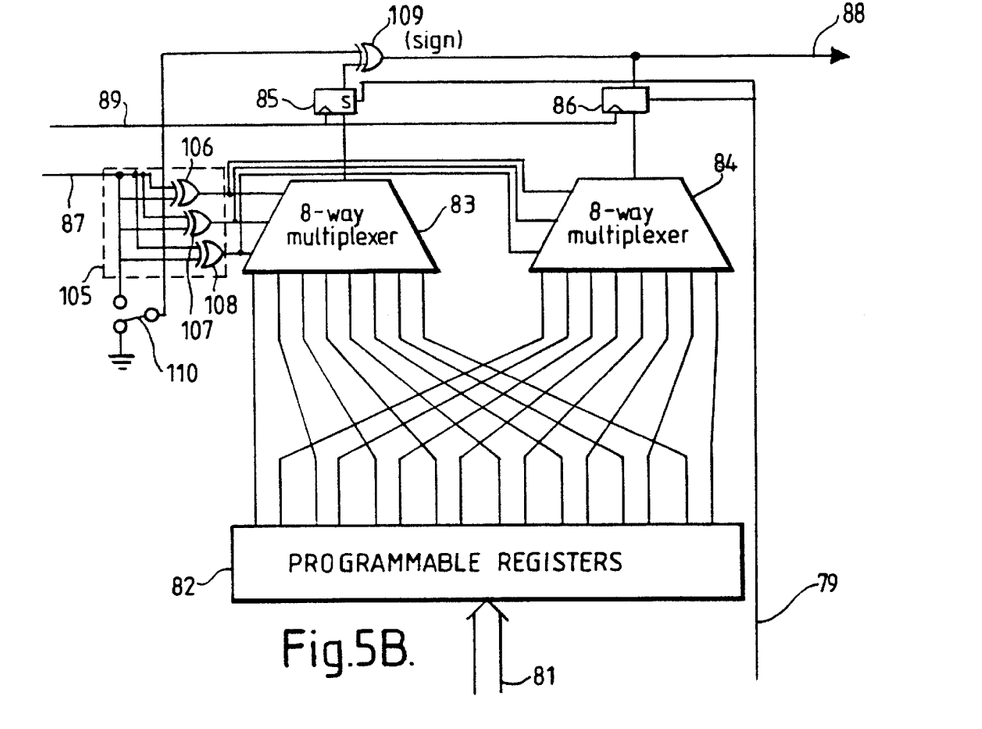

An alternative embodiment is shown in FIG. 5B. Here, the bank 82 comprises only sixteen programmable registers, the multiplexers 83 and 84 each have only eight inputs and a control logic device 105 is connected between the input 87 and the control inputs of the multiplexers. The control logic device 105 is arranged to control the multiplexers 83 and 84 to switch between sequential ones of their inputs from a first to a last input in a first half of the code chip period, and then to switch between sequential ones of their inputs from the last input to the first input in the second half of the code period. This is achieved by connecting the most significant bitline of the input 87 to an input of each of three exclusive-OR gates 106–108 forming part of the control logic device 105. This embodiment can be constructed with less hardware than that of FIG. 5A, yet is able to generate any mask signal which can be generated by the FIG. 5A device and is symmetrical about its centre point.

Figures 9, 11:
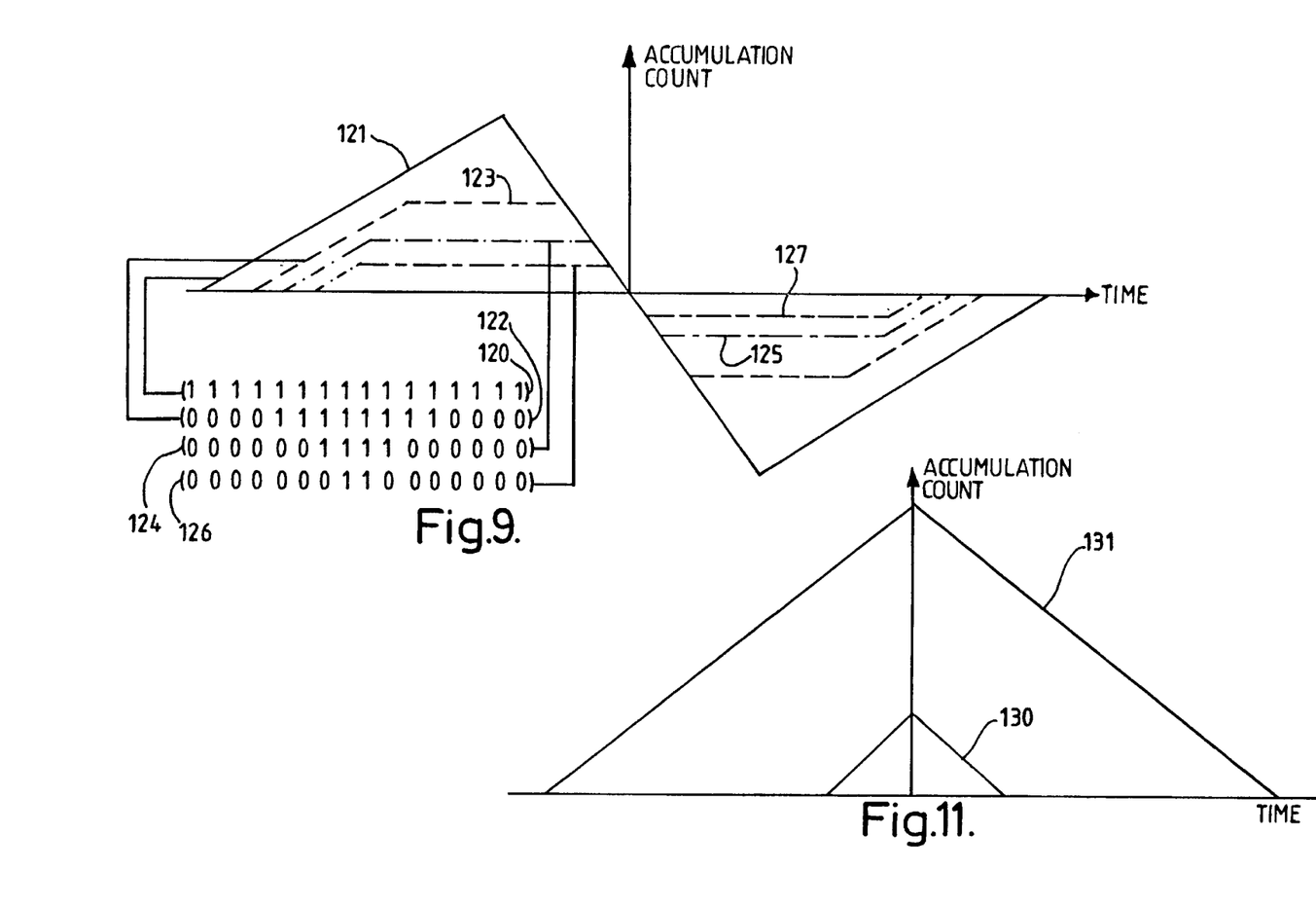
FIG. 9 is a diagram showing how mask signals may be changed during code tracking.
FIG. 11 is a diagram showing different discrimination patterns.

The mask generator device of FIG. 5B is switchable into a second mode by controlling a switch 110 to provide the most significant bitline of the input 87 to an input of a fourth exclusive-OR gate 109. Here, the connection of an exclusive-OR gate 109 at the output of the flip-flop 85 (the sign bit flip-flop) allows anti-symmetrical mask patterns, and therefore anti-symmetrical mask signals, to be easily provided. Here, anti-symmetrical means that the ninth to sixteenth intervals of the mask signal period are an inverted and reverse-order version of the first to eighth intervals of the mask signal period. For example, the mask pattern 00000011-1-1000000 is an anti-symmetrical mask pattern about a centre point between the ones and the minus-ones. The discrimination pattern provided by this mask pattern when used in a signal path to which a prompt code replica is being mixed is shown in FIG. 11. In FIG. 11, the discrimination pattern 130 provided by the anti-symmetrical mask pattern applied with a one-chip early-minus-late code replica is shown alongside a discrimination pattern 131 obtained from a mask pattern comprising sixteen ones applied with a prompt code replica, for comparison. It will be appreciated that the discrimination pattern 130 provides a carrier discriminator with reduced sensitivity to multipath signals, although this is obtained at the cost of a reduced signal-to-noise ratio.

Figure 5C:
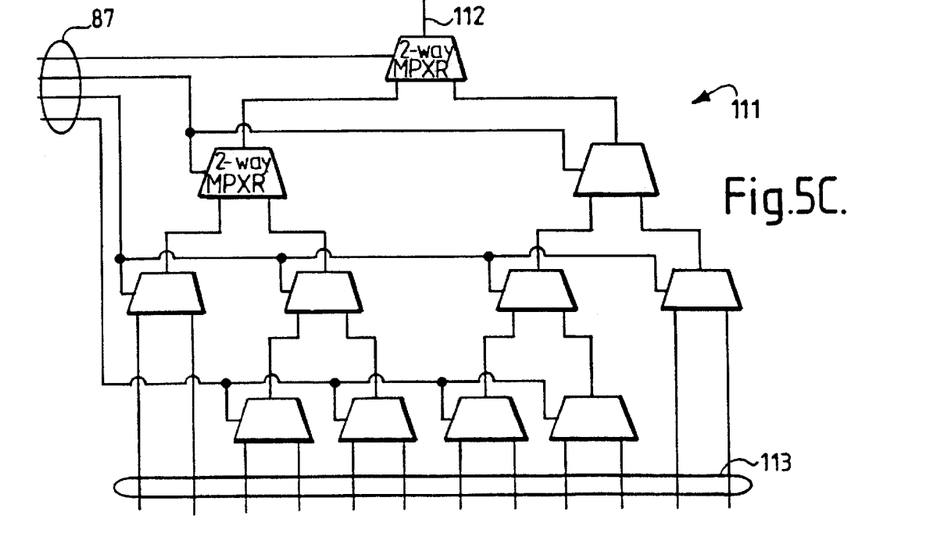
FIG. 5C is a multiplexer used in an alternative mask generator device.

In a further alternative embodiment (not shown) the bank comprises twenty-four programmable registers. Here, the multiplexers 83 and 84 are twelve-way multiplexers having the form shown in FIG. 5C. The multiplexer 111 includes even two-way multiplexers connected to provide a single output 112 from twelve inputs 113. The multiplexers 83 and 84 are each arranged such that they connect their respective programmable register to their respective output for each of the first and second intervals in the period of the mask signal, connect their respective second programmable register to their respective output for the third and fourth intervals in the period of the mask signal, connect their respective eleventh programmable register to their respective output for the thirteenth and fourteenth intervals in the period of the mask signal, and connect their respective twelfth programmable register to their respective output for the fifteenth and sixteenth intervals in the period of the mask signal. This embodiment allows reduced hardware in the bank 82. However, the mask patterns that are able to be provided are limited to those where the first and second bits are the same, the third and the fourth bits are the same, the thirteenth and the fourteenth bits are the same and the fifteenth and the sixteenth bits are the same. In effect, the multiplexers 83 and 84 each read from the same programmable register for two consecutive intervals in the period of the mask signals. This is done four times, from four different programmable registers, in the period of the mask signals.

Figure 6:
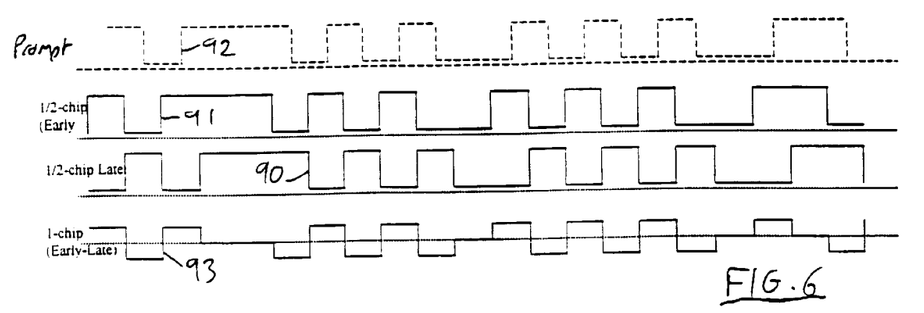
FIGS. 6 and 7 are waveform diagrams illustrating operation of prior art receiver channels.

Referring to FIG. 6, the conventional method for generating one chip early-minus-late code replicas is shown schematically. A one-half chip late version 90 is subtracted from a one-half chip early version 91 of a prompt code replica 92, to provide a three-level one-chip early-minus-late code replica 93. This operation is performed conventionally by the code replica generator 38.

Figure 7:
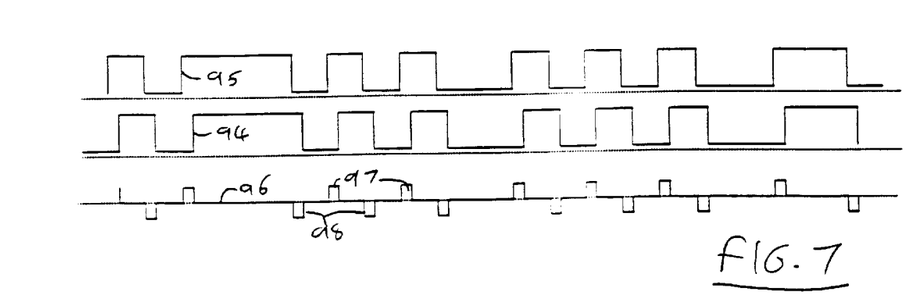

Referring to FIG. 7, the conventional method for generating narrow early-minus-late codes is shown schematically. Here, a late code 94 is separated from an early code 95 by one eighth of a chip. An early-minus-late code 96 is provided by subtracting the code 95 from the code 94. As will be appreciated, positive peaks 97 and negative peaks 98 coincide with rising and falling edges respectively of the prompt code 92. This results in the channel 60 being less affected by reflected signals than where a wider early-minus-late code is used.

Figure 8:
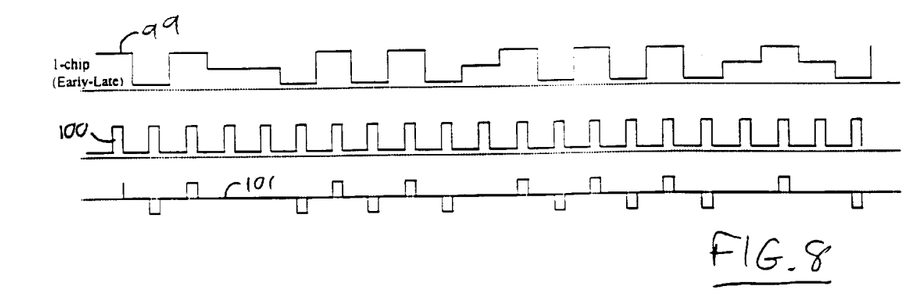
FIG. 8 is a waveform diagram illustrating one form of operation of the FIG. 2 receiver channel.

Referring to FIG. 8, emulation of a narrow early-minus-late code using the FIG. 2 channel 60 is shown schematically. To aid understanding, it may be preferred to imagine that the received signal carrier and code modulations are not present. This allows the code and mask demodulation portions of the signal to become visible. A one-chip early-minus-late code replica 99 is generated by the code replica generator 38 and is provided to the mixers 45 and 46 via the output 40. The odd numbered registers of the bank 82 are programmed, by way of the input 81, to provide the mask pattern 0000001111000000 to respective inputs of the multiplexer 83. The timing of the provision of a mask signal 100 is such that the midpoint of the mask pattern corresponds to the places where an edge of the prompt code 92 could occur. The mask signal 100 provided by this mask pattern is provided to the mask mixers 61 and 62, via the outputs 73 and 72 respectively, and is therefore mixed with the one-chip early-minus-late code replica provided by the mixers 45 and 46. The resultant apparent code 101 emulates the code replica 96 provided by the narrow correlator of FIG. 7, although this does not require the code generator 38 to provide any signals other than one-chip early-minus-late code signals. The code 101 is not actually present at any node of the channel 60. Different degrees of narrow correlation are obtained by changing the number of ones forming part of the mask pattern. Increasing the number of ones increases the width of the pulses of the mask signal and therefore broadens the narrow correlator. Similarly, decreasing the number of ones narrows the width of the pulses of the mask signal and therefore narrows further the narrow correlator.

FIG. 9 shows schematically how the mask signals may be changed during code tracking. During search, the Gold code generator 38 is controlled to provide one-chip early-minus-late code replica signals to the code mixers 45 and 46, and the mask generator 65 is controlled to provide a mask signal corresponding to mask pattern 120 to the mask mixers 61 and 62. This gives a discriminator pattern 121, which is known to give a wide tracking range but is particularly sensitive to multipath signals. When a predetermined degree of code tracking is detected, the mask generator 65 is operated to provide a mask signal corresponding to mask pattern 122 to the mask mixers 61 and 62. This provides a narrower correlator, having a narrower discrimination pattern 123. The channel 60 is then less sensitive to multipath signals. After a period of time, during which the code tracking once again settles, the mask generator 65 is operated to provide a mask signal corresponding to mask pattern 124, resulting in a yet narrower discriminator pattern 125. Finally, a very narrow correlator is provided by operating the mask generator to provide a mask signal corresponding to mask pattern 126, resulting in a very narrow discriminator pattern 127.

The channel 60 correlation characteristics can, accordingly, be dynamically varied during code tracking from a wide correlator to a very narrow correlator, the variation being stepped. More steps may be made than the four step process described above. This feature provides a continuously adaptive code tracking loop.

The selection of the mask pattern, and thus the mask signals, is not restricted to patterns which provide variable narrow correlator effects such as those described above.

Figure 10A:
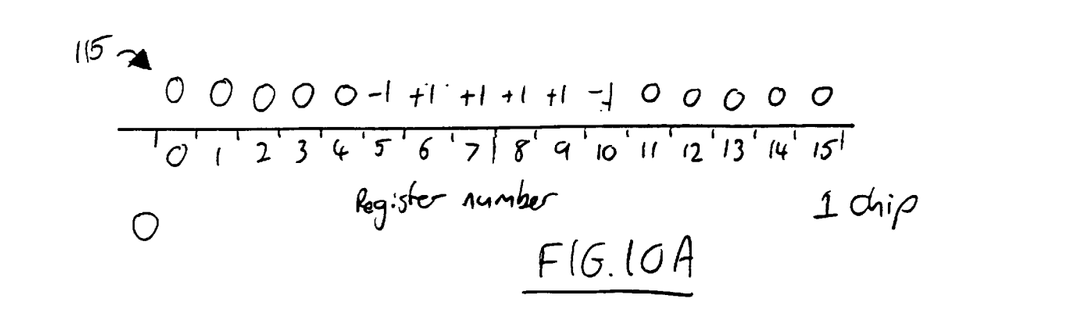
FIG. 10A is a diagram of a mask pattern used in embodiments of this invention.
Figure 10B:
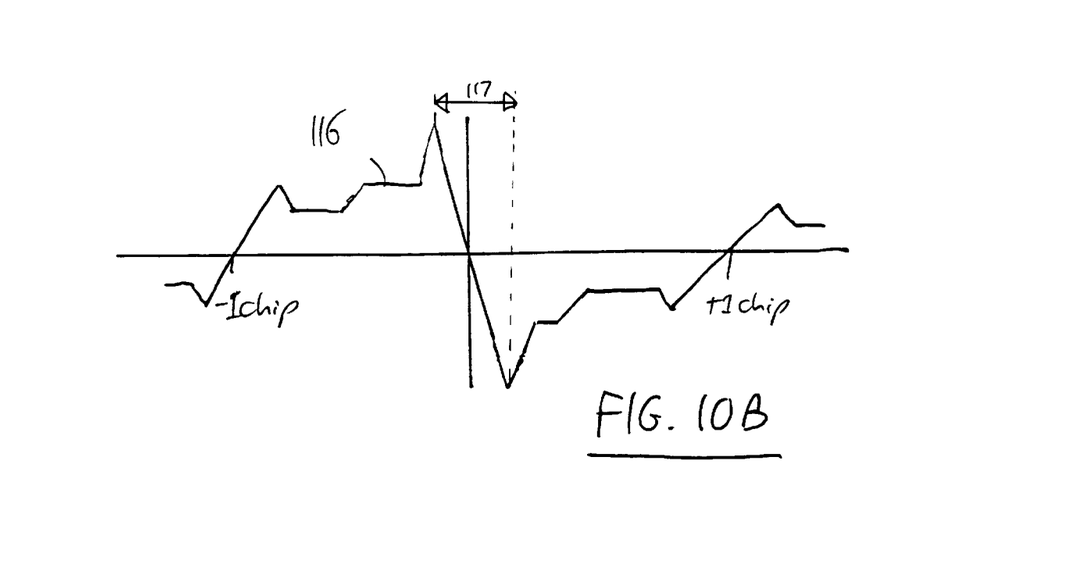
FIG. 10B is a diagram of a discriminator pattern produced as a result of the FIG. 10A mask pattern.

Referring to FIG. 10A, a mask pattern 115 is shown which is symmetrical about its mid-point. The mask pattern 115, when supplied as a mask signal to a mask mixer and mixed with one-chip early-minus-late code signals, produces the discriminator pattern 116 of FIG. 10B. As will be appreciated, the discriminator pattern 116 is superior to a conventional narrow correlator discriminator pattern. In particular, the pattern 116 has a clean working portion 117 around the alignment point, in which portion code steering is optimum. However, the discriminator pattern 116 is of reduced amplitude (compared to one-chip early-minus-late or even narrow correlators) for regions between the peaks defining the working portion 117 and the points 118, 119 corresponding to a one-chip phase advance and a one-chip phase delay respectively. The discriminator pattern 116 therefore allows the channel 60 to have a relatively steep working portion 117, yet a relatively low sensitivity to multipath signals.

The mask pattern, and therefore the discrimination pattern, is selected according to the particular requirements of the channel 60 (FIG. 2) at any given time. Where the receiver is fast moving and in a multipath environment, a large working portion is preferred to maintain lock, despite some increase in sensitivity to multipath signals. In a slow moving receiver, a narrower locking range is acceptable. This allows the use of a discriminator pattern having a reduced sensitivity to multipath signals.

The receiver comprises a plurality of channels 60, the channels usually processing signals received from different respective satellites, although two or more channels may occasionally process signals from a single satellite or one channel may be multiplexed to track two or more satellites. Since the data stored in the bank 82 of programmable registers changes comparatively infrequently, the programmable registers can be used to provide mask patterns for more than one mask generator device. These mask generator devices may or may not relate to the same receiver channel. In this case, each channel has its own multiplexers and flip-flops, although there is a considerable hardware saving through avoiding duplication of data buses and the registers themselves. The connection of the flip-flops 85 and 86 in this case allows one or more mask patterns consisting of 16 ones to be provided despite being connected to a bank 82 which contains a different mask pattern. This is achieved by providing a control signal on the override line 79 of the appropriate mask signal generator or generators.

During operation, once code lock has been obtained, the switch 66 is controlled so that the output 47, rather than the output 48, is connected to the input of the mask mixer 61. This is advantageous since demodulated in-phase and quadrature signals are required only to obtain code lock. Control of the switch 66 in this way allows both the accumulators 51 and 52 to receive signals from the in-phase output 47, which brings advantages as will be appreciated from the following.

In one embodiment, the mask generator 65 is controlled to provide a different mask signal to the mask mixer 61 than is provided to the mask mixer 62. The code replica signals are one-chip early-minus-late code replica signals. The mask signals provided to the mask mixer 61 are narrow correlator emulation mask signals, corresponding to a pattern such as pattern 122 of FIG. 9, and the mask signals provided to the mask mixer 62 are very narrow correlator emulation mask signals, corresponding to a pattern such as the mask pattern 126. In this way, the accumulators 51 and 52 are supplied with signals which are sensitive to multipath signals to different degrees. A software comparator (not shown) is arranged to detect when the output signals of the accumulators 51 and 52 are not equal to each other, in which case the presence of multipath signals is inferred. The software is arranged to detect which of the satellites are being tracked without significant multipath interference at the receiver and, if there is a sufficient number of such satellites, the signals received from those satellites are selected and ranging calculations are performed using only those signals, to improve the accuracy of position fixing or time reference generation.

Where the code replica signals are other than early-minus-late code replica signals, the presence of multipath interference may still be detected. In this case, the comparator detects that the outputs of the accumulators 51 and 52 differ from an expected ratio instead of detecting that they are approximately equal.

In an alternative embodiment (not shown), the switch 66 is placed in the signal paths prior to the code mixers 45 and 46. The switch 66 is controlled in the same manner as described above but the mask mixers 61 and 62 are provided with the same mask signals and the code mixers 45 and 46 are provided with different versions of the replica code. The code mixer 45 is provided with a one-chip early-minus late version of the replica code and the code mixer 46 is provided with a half-chip early-minus-late version of the replica code. In this way, software is able to detect the presence of multipath interference in the same manner as that described above, and the receiver is controlled accordingly.

With either of these embodiments, the output of either of the accumulators 51 and 52 may be used to generate feedback signals to the code NCO 36. Alternatively, the output signals of the accumulators are summed, thereby emulating a more complex mask pattern, and the summed signals used to generate feedback signals to the code NCO 36.

In a further alternative embodiment, the switch 66 is located at the position shown in FIG. 2 and the mask generator 63 is controlled to provide different mask signals to the mask mixers 61 and 62. Here, software is arranged to combine the output signals of the accumulators 51 and 52 to provide an emulation of the results that would be obtained by a more complex mask pattern. The mask mixer 61 is provided with mask signals corresponding to mask pattern 000011-1-1-1-1110000, and the mask mixer 62 is provided with mask pattern 0000000-1-10000000. The software is arranged to sum the signals provided by the accumulators 51 and 52. This results in signals being provided for further processing which are the same as those which would have been obtained if mask pattern 000011-1-2-2-1110000 had been used. In this way, it is possible to emulate the use of a mask generator having a five level output.

What is claimed is:

1. A receiver for receiving and processing radio-frequency pseudo-random encoded signals, the receiver having a channel comprising:

a code replica generator having a first output and being arranged to provide code replica signals on the first output;

a mask generator device having a second output and being controllable to provide any one of at least two predetermined time varying mask signals at the second output;

a frequency translator having a third output and being arranged to receive and to frequency translate the encoded signals and to provide translated signals at the third output in response thereto;

an accumulator;

a signal path of the channel comprising, between the frequency translator and the accumulator:

a code mixer arranged to mix the translated signals with the code replica signals;

a mask mixer arranged to mix the translated signals with the mask signals, the mask signals having a period equal to an integer multiple (1, 2, 3, . . . ) of the chip period of the code replica signals;

the mask generator device comprising a plurality of programmable memory elements, each memory element storing one data bit used in providing the mask signals for at least one predetermined part of the mask signal period;

a control logic device arranged to provide data bits from at least one of the programmable registers for at least two non-consecutive intervals in the mask signal period; and the control logic device being arranged to provide the mask signal with data bits from at least two programmable registers in sequence and subsequently to provide data bits from the at least two programmable registers in reverse sequence in the mask signal period.

2. A receiver according to claim 1 for receiving and processing radio-frequency pseudo-random encoded signals, the receiver having a channel comprising:

a code replica generator having a first output and being arranged to provide code replica signals on the first output;

a mask generator device having a second output and being controllable to provide any one of at least two predetermined time varying mask signals at the second output;

a frequency translator having a third output and being arranged to receive and to frequency translate the encoded signals and to provide translated signals at the third output in response thereto;

an accumulator;

a signal path of the channel comprising, between the frequency translator and the accumulator:

a code mixer arranged to mix the translated signals with the code replica signals; and a mask mixer arranged to mix the translated signals with the mask signals, the mask signals having a period equal to an integer multiple (1, 2, 3, . . . ) of the chip period of the code replica signals;

wherein the mask generator device comprises a plurality of programmable memory elements, each memory element storing one data bit used in providing the mask signals for at least one predetermined part of the mask signal period; and a control logic device arranged to provide data bits from at least one of the programmable registers for at least two non-consecutive intervals in the mask signal period, wherein the control logic device is arranged to provide the mask signal with data bits from at least two programmable registers in sequence and to subsequently provide data bits from at least two programmable registers in reverse sequence and with opposite polarity within the mask signal period.

3. A receiver for receiving and processing radio-frequency pseudo-random encoded signals, the receiver having a channel comprising:

a code replica generator having a first output and being arranged to provide code replica signals on the first output;

a mask generator device having a second output and being controllable to provide any one of at least two predetermined time varying mask signals at the second output;

a frequency translator having a third output and being arranged to receive and to frequency translate the encoded signals and to provide translated signals at the third output in response thereto;

an accumulator;

a signal path of the channel comprising, between the frequency translator and the accumulator:

a code mixer arranged to mix the translated signals with the code replica signals;

a mask mixer arranged to mix the translated signals with the mask signals, the mask signals having a period equal to an integer multiple (1, 2, 3, . . . ) of the chip period of the code replica signals;

the mask generator device comprising a plurality of programmable memory elements, each memory element storing one data bit used in providing the mask signals for at least one predetermined part of the mask signal period;

the mask generator device further comprising at least one multiplexer which is arranged to provide the data bits from the said programmable memory element according to timing signals received from a timing source, thereby providing the mask signal; and a flip-flop connected to the output of each multiplexer, the flip-flop being operable to override the provision of data bits from the programmable memory elements in response to a control signal.

4. A receiver for receiving radio frequency pseudo-random coded signals, a channel of the receiver comprising:

a frequency translator arranged to frequency translate the coded signals to provide translated signals;

a first mixer arranged to mix the translated signals with a local oscillator signal to provide in-phase translated signals on a first signal path; and a second mixer arranged to mix the translated signals with a quadrature version of the local oscillator signal to provide quadrature translated signals on a second signal path;

each of the first and second signal paths comprising a respective further mixer subsequent to its respective mixer, and a respective accumulator subsequent to its further mixer;

the channel further comprising a switch connected following the first and second mixers and prior to the said further mixer in each path, the switch being controllable to provide the further mixers in both of the first and second paths with one of the in-phase translated signals and the quadrature translated signals, the signals on the first and second signal paths each being mixed with an early-minus-late version of a replica code.

5. A receiver according to claim 4, wherein the receiver channel is arranged such that the signals on the first and second signal paths are mixed with the early-minus-late version or versions of the replica code by way of the further mixers in the said paths.

6. A receiver according to claim 4, wherein the receiver channel is arranged such that the signals on the first and second signal paths are mixed with the early-minus-late version or versions of the replica code by way of respective code mixers following the first and second mixers and prior to the switch.

7. A receiver according to claim 4, wherein the receiver channel is arranged such that the early-minus-late version of the replica code mixed with the signals on the first signal path is different from the early-minus-late version of the replica code mixed with the signals on the second path.

8. A receiver according to claim 7, further comprising a comparator arranged to compare output signals of the accumulators and to provide an indication of the presence of multipath interference if the comparison result is not approximately in an expected ratio.

9. A receiver according to claim 4, wherein the said further mixer in the first path is provided with a signal different from that provided to the said further mixer in the second path, and a comparator is arranged to compare output signals of the accumulators and to provide an indication of the presence of multipath interference if the comparison result is not approximately in an expected ratio.

10. A receiver according to claim 6, wherein the said further mixer in the first path is provided with a signal different from that provided to the said further mixer in the second path, and a comparator is arranged to compare output signals of the accumulators and to provide an indication of the presence of multipath interference if the comparison result is not approximately in an expected ratio.

11. A receiver for receiving radio frequency pseudo-random coded signals, having a receiver channel which comprises:
   a frequency translator arranged to frequency translate the coded signals to provide translated signals;
   a first mixer arranged to mix the translated signals with a local oscillator signal to provide in-phase translated signals on a first signal path; and
   a second mixer arranged to mix the translated signals with a quadrature version of the local oscillator signal to provide quadrature translated signals on a second signal path,
   wherein:
   the first signal path comprises a first mask mixer subsequent to said first mixer;
   the second signal path comprises a second mask mixer subsequent to said second mixer and a second accumulator subsequent to the second mask mixer; and
   the receiver further comprises:
   a mask generator device coupled to the mask mixers and controllable to provide any one of at least two different predetermined time-varying mask signals to the mask mixers; and
   a code replica generator arranged to generate early-minus-late code signals and to feed said code signals as replica code signals to mixers in both the first and second signal paths for mixing with the translated signals;
   and wherein the receiver channel further comprises a switch connected following the first and second mixers and prior to the mask mixers to provide at least one of the mask mixers selectively with either the in-phase translated signals or the quadrature translated signals.

12. A receiver according to claim 11, wherein the receiver channel is arranged such that the signals on the first and second signal paths are mixed with early-minus late replica code signals by way of the mask mixers in said paths.

13. A receiver according to claim 11, wherein the receiver channel is arranged such that the signals on the first and second signal paths are mixed with early-minus-late replica code signals by way of respective mask mixers following the first and second mixers and prior to the switch.

14. A receiver according to claim 11, wherein the receiver channel is arranged such that a first group of said early-minus-late replica code signals is mixed with the signals on the first signal path and a second group of said early-minus-late replica code signals, which are different from the first replica code signals, is mixed with the signals on the second signal path.

15. A receiver according to claim 14, further comprising a comparator arranged to compare output signals of the accumulators and to provide an indication of the presence of multipath interference if the comparison result is not approximately in an expected ratio.

16. A receiver according to claim 11, wherein the mask mixer in the first signal path is provided with a signal different from that provided to the mask mixer in the second signal path, and further comprising a comparator arranged to compare output signals of the accumulators and to provide an indication of the presence of multipath interference if the comparison result is not approximately in an expected ratio.

17. A receiver according to claim 13, wherein the mask mixer in the first signal path is provided with a signal different from that provided to the mask mixer in the second signal path, and further comprising a comparator arranged to compare output signals of the accumulators and to provide an indication of the presence of multipath interference if the comparison result is not approximately in an expected ratio.

18. A receiver according to claim 11, wherein the mask generator device is arranged such that the mask signals have a period equal to an integer multiple $(1, 2, 3, \ldots)$ of the chip period of the replica code signals.

19. A receiver according to claim 16, wherein the mask generator device is arranged such that the mask signals have a period equal to an integer multiple $(1, 2, 3, \ldots)$ of the chip period of the replica code signals.

20. A receiver according to claim 18, wherein the mask generator device comprises a plurality of programmable memory elements, each memory element storing one data bit used in providing the mask signals for at least one predetermined part of the mask signal period.

21. A receiver according to claim 20, wherein the mask generator device further comprises at least one multiplexer which is arranged to provide the data bits from the said programmable memory element according to timing signals received from a timing source, thereby providing the mask signals.

22. A receiver according to claim 21, wherein the timing source is a numerically controlled oscillator.

23. A receiver according to claim 22, wherein the numerically controlled oscillator is arranged to provide clock signals to the code replica generator.

24. A receiver according to claim 21, wherein the multiplexer is arranged to provide a data bit from one of the programmable memory elements for at least two consecutive intervals in the mask signal period.

25. A receiver according to claim 20, further comprising a control logic device arranged to provide data bits from at least one of the programmable registers for at least two non-consecutive intervals in the mask signal period.

26. A receiver according to claim 25, wherein the control logic device is arranged to provide the mask signals with data bits from at least two programmable registers in sequence and subsequently to provide data bits from the at least two programmable registers in reverse sequence in the mask signal period.

27. A receiver according to claim 25, wherein the control logic device is arranged to provide the mask signals with data bits from at least two programmable registers in sequence and to subsequently provide data bits from at least two programmable registers in reverse sequence and with opposite polarity within the mask signal period.

28. A receiver according to claim 20, comprising at least one further channel for processing frequency translated signals different from those processed by the first channel, the programmable registers being shared by the channels.

29. A receiver according to claim 21, comprising at least one further channel for processing frequency translated signals different from those processed by the first channel, the programmable registers being shared by the channels, and further comprising a flip-flop connected to the output of each multiplexer, the flip-flop being operable to override the provision of data bits from the programmable memory elements in response to a control signal.

30. A method of processing radio frequency pseudo-random coded signals in a radio receiver, comprising steps of:
   frequency translating the encoded signals to provide translated signals;
   generating local oscillator signals having a quadrature phase relationship with each other;
   generating replica code signals as at least one early-minus-late code signal having a chip period;
   storing at least two different mask patterns;
   successively providing mask signals corresponding to different ones of the mask patterns;
   mixing the translated signals with the local oscillator signals, the replica code signals and the mask signals to provide resultant in-phase and quadrature mixer output signals;
   accumulating the resultant signals over predetermined accumulation intervals to provide accumulation output signals; and
   prior to mixing the translated signals with the mask signals, selectively switching between in-phase and quadrature versions of the translated signals in order that at least one mixing operation in which the translated signals are mixed with the mask signals can be selectively applied to either one of an in-phase version and a quadrature version of the translated signals.

31. A method according to claim 30, wherein the mask signals have a period equal to an integral multiple (1, 2, 3, . . . ) of the chip period.

32. A method according to claim 31, wherein the period of the mask signals is equal to the chip period.

33. A method according to claim 30, wherein the translated signals are mixed with the replica code signals in the same mixing operation as the mixing of the translated signals with the mask signals.

34. A method according to claim 30, wherein the translated signals are mixed with the replica code signals separately from being mixed with the mask signals, the mixing with the code signals occurring prior to said switching.

35. A method according to claim 34, wherein the mixing of the translated signals with the replica code signals comprises mixing in-phase and quadrature versions of the translated signals with different respective early-minus-late replica code signals.

36. A method according to claim 31, wherein the accumulating step includes performances of first and second accumulation processes, the method including comparing the accumulation output signals from said first and second accumulation processes and providing an indication of the presence of multipath interference if the comparison result is not approximately in an expected ratio.

37. A method according to claim 30, including comparing the accumulation output signals derived from the accumulation of signals resulting from mixing the translated signals with different respective mask signals and providing an indication of the presence of multipath interference if the comparison result is not approximately in an expected ratio.

38. A method according to claim 31, including comparing the accumulation output signals derived from the accumulation of signals resulting from mixing the translated signals with different respective mask signals and providing an indication of the presence of multipath interference if the comparison result is not approximately in an expected ratio.

39. A method according to claim 34, including comparing the accumulation output signals derived from the accumulation of signals resulting from mixing the translated signals with different respective mask signals and providing an indication of the presence of multipath interference if the comparison result is not approximately in an expected ratio.

40. A receiver for receiving and processing radio-frequency pseudo-random encoded signals, the receiver having a first channel comprising:
   a code replica generator having a first output and being arranged to provide code replica signals on the first output;
   a mask generator device having a second output and being controllable to provide any one of at least two predetermined time varying mask signals at the second output;
   a frequency translator having a third output and being arranged to receive and to frequency translate the encoded signals and to provide translated signals at the third output in response thereto;
   an accumulator;
   a signal path of the first channel comprising, between the frequency translator and the accumulator:
   a code mixer arranged to mix the translated signals with the code replica signals;
   a mask mixer arranged to mix the translated signals with the mask signals, the mask signals having a period equal to an integer multiple (1, 2, 3, . . . ) of the chip period of the code replica signals;
   the mask generator device comprising a plurality of programmable memory elements, each memory element storing one data bit used in providing the mask signals for at least one predetermined part of the mask signal period; and
   at least one further channel for processing frequency translated signals different from those processed by the first channel, the programmable registers being shared by the channels; and
   a flip-flop connected to the output of each multiplexer, the flip-flop being operable to override the provision of data bits from the programmable memory elements in response to a control signal.

* * * * *